June 7, 1927.
A. TIMEUS
1,631,439
LOCKING MECHANISM FOR SHOCK ROPES
Filed Aug. 17, 1926
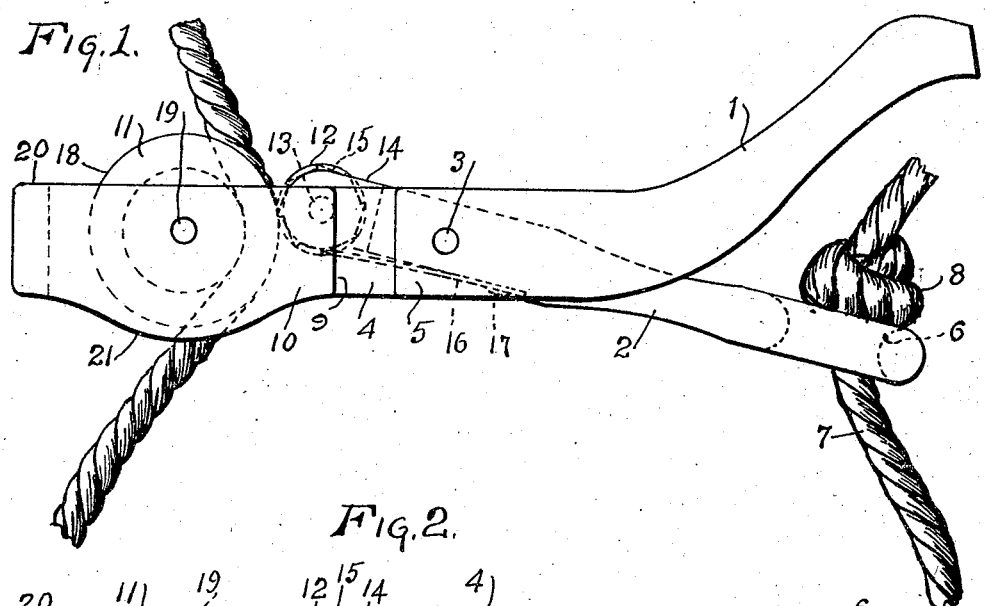
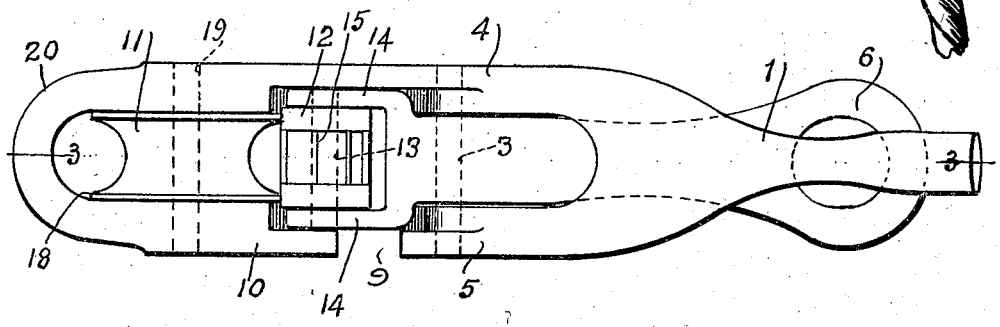
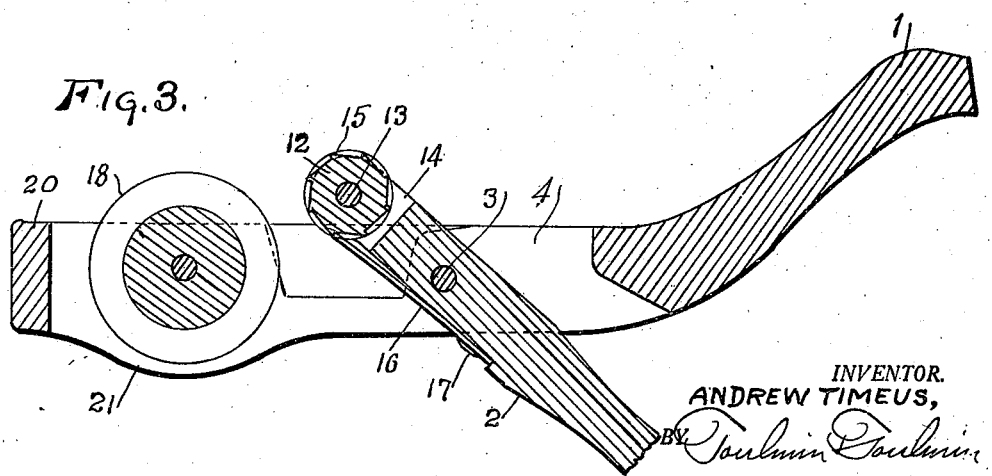
INVENTOR.
ANDREW TIMEUS,
BY *Toulmin & Toulmin*
ATTORNEYS.

Patented June 7, 1927.

1,631,439

UNITED STATES PATENT OFFICE.

ANDREW TIMEUS, OF SIDNEY, OHIO.

LOCKING MECHANISM FOR SHOCK ROPES.

Application filed August 17, 1926. Serial No. 129,836.

My invention relates to shock ties.

It is the object of my invention to provide an implement which will facilitate handling the rope for the temporary tying of corn shocks or other loose material.

It is my further object to provide such an implement which will remain in tying position or may be quickly moved to untying position to permit the ready detachment of the rope from the bundle or shock.

It is a further object to provide an implement in which the rope will not slip off of the pulley or ride up upon its sharp edge and destroy the rope.

It is a further object to provide an implement which can be operated with one hand while the rope is drawn taut with the other.

Referring to the drawings:

Figure 1 is a side elevation of the implement from the side on which the rope is inserted;

Figure 2 is a plan view of the implement;

Figure 3 is a section on the line 3—3 of Figure 2.

Referring to the drawings of the implement as exemplified in the drawing, 1 is a handle which the operator grasps when the declutching of the implement from the rope takes place.

On this handle is pivoted a lever 2. This lever is supported by a pivot pin 3. Either end of this pin is supported in the side walls 4 and 5 between which the lever 2 operates. The lever 2 has at its free end an eye 6 for receiving a rope 7 which is knotted at 8 to prevent it slipping through the eye.

The other end of the rope which is carried around the bundle or shock is passed through the opening 9 between the side wall member 5 and side wall member 10 into the space between the pulley 11 and the ratchet wheel 12 which is pivotally carried at 13 between the jaws 14 of the lever 2. This ratchet or friction wheel is provided with teeth 15 and a spring pawl 16 mounted at 17 on the lever 2 to prevent it rotating backwardly. The pulley 11 is provided with flanges 18 and is pivoted on the shaft 19 carried in the side walls 4 and 10. These side walls are joined by a U-shaped end piece 20.

Thus, the handle 1, side wall members 4, 5, and 10 and the end piece 20 constitute a frame which has a slot 9 in the side thereof, through which the rope may be inserted. The side walls 4 and 10 adjacent the pulley have depending flanges 21 which extend beyond the flanges 18 of the pulley to prevent rope from pulling side wise on the pulley and pulling off of it or sawing the rope on the sharp edges 18.

It will be observed that, when the bundle is encircled by the rope 7, one end of which engages the free end of the handle 2 and the other end of which is pulled between the pulley and the ratchet wheel, the ratchet wheel will be pulled down on the rope forcing it against the pulley, the edges of the ratchet wheel engaging with the edges of the pulley as a brake as well as a clamp for the rope.

Thus, the bundle will be held in compressed condition while the permanent binder is placed about the shock or bundle.

When this is done, the handle can be pulled towards the operator, depressing the pulley end against the resilient shock or bundle, thus freeing the rope or pulley from the ratchet wheel 12, permitting the rope to be loosened and, if desired, removed through the slot 9.

It will be understood that I desire to comprehend within my invention such modifications as may be necessary to adapt it to varying conditions and uses.

Having thus fully described my invention, what I claim as new and desire to secure by Letters Patent, is:—

In combination, a frame having a slot in the side thereof communicating with a slot passing fore and aft thereof, a lever pivoted therein having an eye at one end and jaws at the other, a ratchet wheel pivotally supported between said jaws, a spring pawl carried by said lever for preventing the return movement of said ratchet wheel, a pulley mounted in said frame pivotally adapted to be engaged by said ratchet wheel, and a handle on said frame disposed at an angle thereto and depending flanges on the side wall of the frame extending below the margins of the pulley.

In testimony whereof I affix my signature.

ANDREW TIMEUS.